June 24, 1958
M. GEISZLER
2,839,851
SCARIFIER AND SCRAPER
Filed Dec. 7, 1954
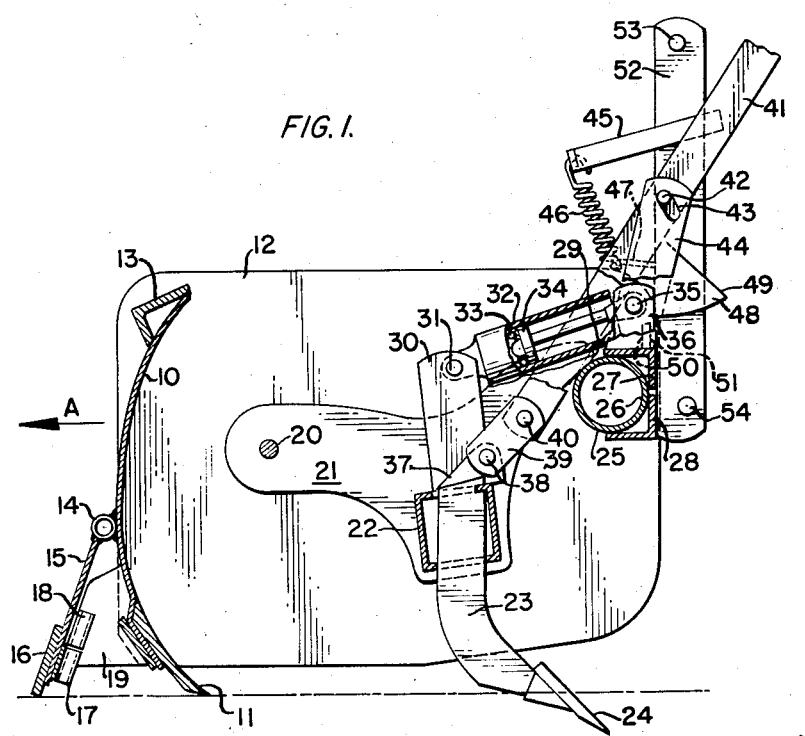
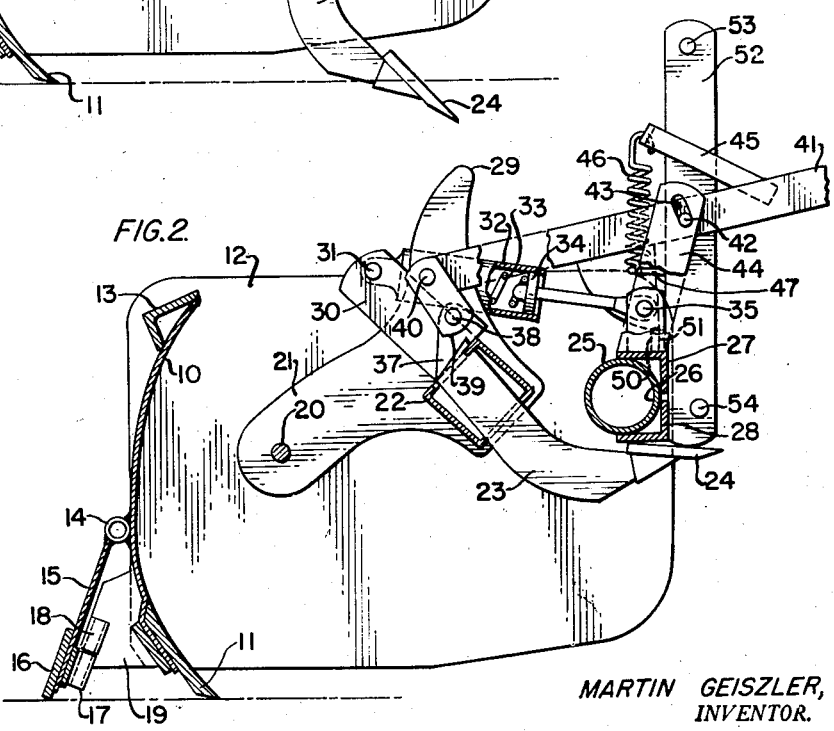
MARTIN GEISZLER,
INVENTOR.
BY George Douglas Jones
ATTORNEY.

United States Patent Office 2,839,851
Patented June 24, 1958

2,839,851

SCARIFIER AND SCRAPER

Martin Geiszler, Bell, Calif., assignor to Hydraulic Tool and Equipment Co., Inc., South Gate, Calif., a corporation of California Application December 7, 1954, Serial No. 473,618

9 Claims. (Cl. 37—145)

This invention relates to a scarifier and scraper for use in connection with tractors, or the like, for routing the surface of the ground and scraping it away.

According to the present invention a scraper blade is motivated, or carried, by a tractor and a plurality of scarifier teeth are mounted in retractable relationship relative to the surface of the ground and relative to a level at which the blade engages the same. This retractable relationship of the scarifier teeth relative to the blade permits alternate use of the blade with or without the scarifying action of the teeth. Novel means is provided for retracting the scarifier teeth upwardly from the surface of the ground and for maintaining the same retracted. In addition, means is provided for substantially balancing the scarifier teeth whereby they may be easily manually retracted and locked into a position above the surface of the ground being worked by the blade. The blade is provided with a pivoted flipper blade at the normally rear side thereof, arranged to scrape the earth when the blade is moved in a backwardly direction by the tractor operating the same.

It is an object of the invention to provide a scarifier and scraper having novel means for retracting the scarifier teeth relative to the level of the earth being worked by the blade thereof.

Another object of the invention is to provide a scarifier and scraper having retractable scarifier teeth which are provided with means for substantially balancing the weight thereof when raised into retracted position thereby minimizing the manual effort necessary to retract the scarifier teeth.

Another object of the invention is to provide a novel retracting linkage mechanism which not only retracts the scarifier teeth into a position above the surface of the ground being worked by the scraper blade but in addition locks the scarifier teeth in both extended and retracted positions.

A further object of the invention is to provide a scarifier and scraper which may be operated in connection with conventional elevating hitches operable at the rear of conventional tractors.

A still further object of the invention is to provide a scarifier and scraper which is very simple and economical to produce, easy to operate and which is very durable and efficient.

Other objects and advantages of the invention may be apparent from the following specification, appended claims and accompanying drawings in which:

Fig. 1 is a vertical cross-sectional view of a scarifier and scraper according to the present invention and showing the scarifier teeth thereof extended downwardly into a position wherein they are operated to rout the surface of the ground and loosen the same so that it may be scraped up by the scraper blade rearwardly thereof; and Fig. 2 of the drawings is a view similar to Fig. 1 showing the scarifier teeth disposed in retracted position above the surface being worked by the scraper blade.

As shown in Fig. 1 of the drawings, the scarifier and scraper, according to the present invention, is provided with a scraper blade 10 having a scraping edge member 11 at the lower extremity thereof. The blade 10 interconnects end plates 12 and this blade 10 is reinforced by means of an angle member 13 disposed at the upper edge of the blade 10 and rigidly interconnecting the end plates 12.

Pivoted on the shaft 14 at the rear of the blade 10 is a flipper blade body 15 having a scraping edge member 16 adapted to scrape the ground when the blade is moved in the reverse direction, as indicated by the arrow A in Fig. 1 of the drawings.

Fixed to the forward side of the flipper blade 15 is a tubular member 17 adapted to align with another tubular member 18 which is fixed to a gusset structure 19 rigidly connected to the scraper blade 10. By this means the flipper blade 15 may be fixed to the gusset structure 19 by inserting a pin through the tubular elements 17 and 18.

Pivoted to the scraper blade end plates 12 by means of pins 20 are scarifier end plates 21. These plates 21 are disposed adjacent the end plates 12 and carry a scarifier supporting bar 22 fixed between them and having conventional means for supporting arms 23 of the scarifier teeth 24. Interconnecting the forward portions of the scraper blade end plates 12 is a cross member 25 consisting of a tubular bar or cross member 26 and a pair of angles 27 and 28. It will be seen that the scarifier end plates 21 are provided with a stop portion 29 which engage the tubular cross member 26 when the scarifier teeth 24 are in the lowermost extended position, as shown in Fig. 1 of the drawings.

Fixed to the normally upper side of the bar 22 is a bracket member 30 having a pin 31 which pivotally supports a spring casing 32 having a compression spring 33 therein. This compression spring 33 is engaged by a plunger 34 which is pivotally connected to the pin 35 supported in a bracket 36 fixed on the upper side of the cross member element 27.

Fixed to the upper side of the scarifier bar 22 is a bracket 37 having a pin 38 to which is pivoted a link member 39 having a pin 40 to which the lower end of the lever 41 is pivoted. This lever 41 is a manually operated lever adapted for use in retracting the scarifier upwardly relative to the scraping blade element 11 and the surface of the ground worked thereby. The lever 41, while it is designed for manual actuation, may be equipped with power operated means for retracting and extending the scarifier teeth upwardly and downwardly, as desired. This lever 41 is provided with a fulcrum pin 42 positioned in a slot or slide bearing means 43 of a bracket member 44 which serves as a fulcrum member and is fixed to the upper side of the cross member element 27; said fulcrum pin providing a pivotal axis for the lever 41.

Secured to the lever 41 is an arm 45 having a spring 46 connected therewith at its one end. The opposite end of the spring 46 is connected to a clip 47 fixed to the bracket 44. The lever 41 is provided with a quadrant portion 48 having an edge stop portion 49 adapted to engage the rear edge 50 of a stop member 51 for locking the scarifier in retracted position when disposed, as shown in Fig. 2 of the drawings, all of which will be described in detail in the description of operation.

Fixed to the forward portions of the cross member 28 are hitch members 52 having pivot elements 53 and 54 which may be connected with the hitch of a tractor and preferably to a hitch of the elevating type adapted to raise the scarifier and scraper above the surface of the ground for transportation in connection with the tractor. It will be understood, however, that the scarifier and scraper, according to the present invention, may be otherwise connected to a tractor, as desired.

When the scarifier and scraper, according to the present invention, is being operated, the scraper blade 11 is adapted to scrape up earth which has been routed and loosened by the scarifier teeth 24 which extend down into the ground and move along ahead of the blade scraper element 11. When the tractor is moved rearwardly in the direction of the arrow A, the flipper blade 15 and its scraper portion 16 may be used to scrape up loosened earth. This blade 15, being pivoted on the pivotal element 14 fixed to the blade 10, may be operated as a drag plate when the blade 10 is moved forwardly or may be fixed to the gussets 19 and rigidly connected with the blade 10 in spaced relation with the scraping edge 11 by inserting a pin through the tubular elements 17 and 18 and is hereinbefore described.

When it is desired to retract the scarifier teeth 24 upwardly, the lever 41 is grasped and is manually forced forwardly which causes the link 39 at its pivotal connections 38 and 40 to pivot out of over-center position whereupon the pin 42 fixed to the lever 41 moves downwardly toward the bottom of the slot or slide bearing 43, permitting the quadrant 48 to slide rearwardly on the stop 51 while the lever 41 exerts upward force on the bar 22 through the link 39 whereupon the scarifier end plates 21 and bar 22 are pivoted upwardly about the axis of the pins 20. As the scarifier moves upwardly, the axis of the pins 31 and 35, supporting the compression spring 33, move upwardly relative to the pivot pins 20 whereupon the force of the spring 33 tends to substantially overbalance the weight of the scarifier mechanism. This substantially reduces the manual effort necessary in the operation of the lever 41 to retract the scarifier into the uppermost position, as shown in Fig. 2 of the drawings. It will be noted that during the pivotal movement of the lever 41 that the lower edge of the quadrant 48 engages the stop member 51 and slides backwardly thereupon until the edge stop portion 49 passes the edge 50 of the stop member 51 whereupon the pin 42 completes its travel to the bottom of the slot or slide bearing 43, permitting the edge stop portion 49 of the quadrant 48 to lock against the stop 50 and retain the scarifier in the retracted position, as shown in Fig. 2 of the drawings.

When extending the scarifier downwardly, the reverse mode of operation is followed whereby elevation of the lever 41 immediately releases the edge stop portion 49 of the quadrant 48 from the rearward side 50 of the stop member 51. Further movement of the lever 41 upwardly tends to force the scarifier downwardly and to compress the spring 33 until the teeth 24 are completely lowered and the link 39 is disposed in over-center position, as shown in Fig. 1 of the drawings.

When the link 39 is disposed in over-center position, the lever 41 engages the tubular element 26 of the cross member 28 and the spring 46 tends to hold the lever in its over-center position relative to the link 39 and pivotal point 38 supported on the bracket 37 and fixed to the upper side of the cross member 22. When the scarifier is extended into its lowermost position, as shown in Fig. 1 of the drawings, it is ready for operations pertaining to the routing and loosening of the earth's surface so that it may be scraped up by the blade elements 11 and 16.

Various modifications of the invention may be resorted to in a manner limited only by a just interpretation of the following claims.

I claim:

1. In a scarifier and scraper, a main scraper blade, a scarifier support pivotally mounted relative to said blade so as to be movable upwardly and downwardly relative to the working edge of the blade, earth working teeth on said support and arranged to rout earth ahead of said blade, a fulcrum member having slide bearing means and being stationarily mounted relative to said blade, a lever having a pivotal axis and supported on said fulcrum member, said lever being connected with said scarifier support and movable on said slide bearing means laterally of said pivotal axis, a quadrant on said lever having an edge stop portion, a stop member mounted in stationary position relative to said blade, said slide bearing means on said fulcrum member permitting the pivotal axis of said lever to move toward said stop member, whereby said quadrant overrides said stop member during pivotal movement of said lever to raise said scarifier support and permit the edge stop portion of said quadrant to slide past said stop member and engage the same when said scarifier support is elevated to a position wherein said scarifier teeth are retracted upwardly out of the ground.

2. In a scarifier and scraper, a main scraper blade, a scarifier support pivotally mounted relative to said blade so as to be movable upwardly and downwardly relative to the working edge of the blade, earth working teeth on said support and arranged to rout earth ahead of said blade, a fulcrum member having slide bearing means and being stationarily mounted relative to said blade, a lever having a pivotal axis and supported on said fulcrum member, a link pivotally connecting said lever with said scarifier support, said lever movable on said slide bearing means laterally of its axis and also movable with respect to said fulcrum member, a quadrant on said lever having an edge stop portion, a stop member mounted in stationary position relative to said blade, said slide bearing means on said fulcrum member permitting the pivotal axis of said lever to move toward said stop member, whereby said quadrant overrides said stop member during pivotal movement of said lever to raise said scarifier support and permit the edge stop portion of said quadrant to slide past said stop member and engage the same when said scarifier support is elevated to a position wherein said scarifier teeth are retracted upwardly out of the ground.

3. In a scarifier and scraper, a main scraper blade, a scarifier support pivotally mounted relative to said blade so as to be movable upwardly and downwardly relative to the working edge of the blade, earth working teeth on said support and arranged to rout earth ahead of said blade, a fulcrum member having slide bearing means and being stationarily mounted relative to said blade, a lever having a pivotal axis and supported on said fulcrum member, a link pivotally connecting said lever with said scarifier support, said lever movable on said slide bearing means laterally of its axis and also movable with respect to said fulcrum member, a quadrant on said lever having an edge stop portion, a stop member mounted in stationary position relative to said blade, said slide bearing means on said fulcrum member permitting the pivotal axis of said lever to move toward said stop member, whereby said quadrant overrides said stop member during pivotal movement of said lever to raise said scarifier support and permit the edge stop portion of said quadrant to slide past said stop member and engage the same when said scarifier support is elevated to a position wherein said scarifier teeth are retracted upwardly out of the ground, a stop for said lever disposed to position the fulcrum axis of said lever and its pivotal connections with said link and scarifier support in overcenter relationship for locking the same in downwardly extending position wherein said teeth are projected into the ground when the working edge of said blade is in earth scraping position.

4. In a scarifier and scraper, a main scraper blade, plates on opposite ends of said blade and extending forwardly thereof, a scarifier support carried by said plates and pivotally mounted relative to said blade so as to be movable upwardly and downwardly relative to the working edge of the blade, earth working teeth on said support and arranged to rout earth ahead of said blade, a fulcrum member having slide bearing means and being stationarily mounted relative to said blade, a lever having a pivotal axis and supported on said fulcrum member, a link pivotally connecting said lever with said scarifier support, said lever movable on said slide bearing means laterally of its axis and also movable with respect to said fulcrum member, a quadrant on said lever having an edge stop portion, a stop member mounted in stationary position relative to said blade, said slide bearing means on said fulcrum member permitting the pivotal axis of said lever to move toward said stop member, whereby said quadrant overrides said stop member during pivotal movement of said lever to raise said scarifier support and permit the edge stop portion of said quadrant to slide past said stop member and engage the same when said scarifier support is elevated to a position wherein said teeth are retracted upwardly out of the ground.

5. In a scarifier and scraper, a main scraper blade, plates on opposite ends of said blade and extending forwardly thereof, a scarifier support carried by said plates and pivotally mounted relative to said blade so as to be movable upwardly and downwardly relative to the working edge of the blade, earth working teeth on said support and arranged to rout earth ahead of said blade, a cross member fixed between said plates, a fulcrum member having slide bearing means and being on said cross member and stationarily mounted relative to said blade, a lever having a pivotal axis and supported on said fulcrum member, a link pivotally connecting said lever with said scarifier support, said lever movable on said slide bearing means laterally of its axis and also movable with respect to said fulcrum member, a quadrant on said lever having an edge stop portion, a stop member on said cross member mounted in stationary position relative to said blade, said slide bearing means on said fulcrum member permitting the pivotal axis of said lever to move toward said stop member, whereby said quadrant overrides said stop member during pivotal movement of said lever to raise said scarifier support and permit the edge stop portion of said quadrant to slide past said stop member and engage the same when said scarifier support is elevated to a position wherein said scarifier teeth are retracted upwardly out of the ground.

6. In a scarifier and scraper, a main scraper blade, plates on opposite ends of said blade and extending forwardly thereof, a scarifier support carried by said plates and pivotally mounted relative to said blade so as to be movable upwardly and downwardly relative to the working edge of the blade, earth working teeth on said support and arranged to rout earth ahead of said blade, a cross member fixed between said plates, a fulcrum member having slide bearing means and fixed on said cross member and stationarily mounted relative to said blade, a lever having a pivotal axis and supported on said fulcrum member, a link pivotally connecting said lever with said scarifier support, said lever movable on said slide bearing means laterally of its axis and also movable with respect to said fulcrum member, a quadrant on said lever having a stop portion, an edge stop member on said cross member mounted in stationary position relative to said blade, said slide bearing means on said fulcrum member permitting the pivotal axis of said lever to move toward said stop member, whereby said quadrant overrides said stop member during pivotal movement of said lever to raise said scarifier support and permit the edge stop portion of said quadrant to slide past said stop member and engage the same when said scarifier support is elevated to a position wherein said scarifier teeth are retracted upwardly out of the ground, a spring balance interconnecting said cross member and scarifier support and movable into position when said support is retracted upwardly whereby the force axis of said spring balance acts over the pivotal axis of said support to substantially overcome the weight thereof.

7. In a scarifier and scraper, a main scraper blade, plates on opposite ends of said blade and extending forwardly thereof, a scarifier support carried by said plates and pivotally mounted relative to said blade so as to be moved upwardly and downwardly relative to the working edge of the blade, earth working teeth on said support and arranged to rout earth ahead of said blade, a cross member fixed between said plates, a fulcrum member having slide bearing means and fixed on said cross member and stationarily mounted relative to said blade, a lever having a pivotal axis and supported on said fulcrum member, a link pivotally connecting said lever with said scarifier support, said lever movable on said slide bearing means laterally of its axis and also movable with respect to said fulcrum member, a quadrant on said lever having an edge stop portion, a stop member on said cross member mounted in stationary position relative to said blade, said slide bearing means on said fulcrum member permitting the pivotal axis of said lever to move toward said stop member, whereby said quadrant overrides said stop member during pivotal movement of said lever to raise said scarifier support and permit the edge stop portion of said quadrant to slide past said stop member and engage the same when said scarifier support is elevated to a position wherein said scarifier teeth are retracted upwardly out of the ground, a spring balance interconnecting said cross member and scarifier support and movable into position when said support is retracted upwardly whereby the force axis of said spring balance acts over the pivotal axis of said support to substantially overcome the weight thereof, said scarifier support positioned at the normally front portion of the blade, a flipper blade pivotal at the normally rear portion of the blade and arranged to scrape the earth when said blade is moved rearwardly, and means to lock said flipper blade relative to the main scraper blade and prevent pivotal movement of the flipper blade.

8. In a scarifier and scraper, a main scraper blade, plates on opposite ends of said blade and extending forwardly thereof, a scarifier support carried by said plates and pivotally mounted relative to said blade so as to be movable upwardly and downwardly relative to the working edge of the blade, earth working teeth on said support and arranged to rout earth ahead of said blade, a cross member fixed between said plates, a fulcrum member having slide bearing means and fixed on said cross member and stationarily mounted relative to said blade, a lever having a pivotal axis and supported on said fulcrum member, a link pivotally connecting said lever with said scarifier support, said lever movable on said slide bearing means laterally of its axis and also movable with respect to said fulcrum member, a quadrant on said lever having a stop portion, an edge stop member on said cross member mounted in stationary position relative to said blade, said slide bearing means on said fulcrum member permitting the pivotal axis of said lever to move toward said stop member, whereby said quadrant overrides said stop member during pivotal movement of said lever to raise said scarifier support and permit the edge stop portion of said quadrant to slide past said stop member and engage the same with its stop portion when said scarifier support is elevated to a position wherein said scarifier teeth are retracted upwardly out of the ground, and hitch means fixed to said cross member.

9. In a scarifier and scraper, a main scraper blade, plates on opposite ends of said blade and extending forwardly thereof, a scarifier support carried by said plates and pivotally mounted relative to said blade so as to be movable upwardly and downwardly relative to the working edge of the blade, earth working teeth on said support and arranged to rout earth ahead of said blade, a cross member fixed between said plates, a fulcrum member having slide bearing means fixed on said cross member stationarily mounted relative to said blade, a lever having a pivotal axis and supported on said fulcrum member, a link pivotally connecting said lever with said scarifier support, said lever movable on said slide bearing means laterally of its axis and also movable with respect to said fulcrum member, a quadrant on said lever having an edge stop portion, a stop member on said cross member mounted in stationary position relative to said blade, said slide bearing means on said fulcrum member permitting the pivotal axis of said lever to move toward said stop member, whereby said quadrant overrides said stop member during pivotal movement of said lever to raise said scarifier support and permit the edge stop portion of said quadrant to slide past said stop member and engage the same with its stop portion when said scarifier support is elevated to a position wherein said scarifier teeth are retracted upwardly out of the ground, and hitch means fixed to said cross member, said hitch means having vertically spaced hitch connections to cooperate with an elevating hitch.

References Cited in the file of this patent
UNITED STATES PATENTS

| | | |
|---|---|---|
| 2,566,562 | Hale | Sept. 4, 1951 |
| 2,698,492 | Justice | Jan. 4, 1955 |